United States Patent [19]
Hashiguchi

[11] Patent Number: 5,987,540
[45] Date of Patent: Nov. 16, 1999

[54] SYSTEM HAVING A CLOCK SIGNAL GENERATING CIRCUIT FOR SELECTIVELY GENERATING ONE OF THE REQUESTED CLOCK SIGNALS AND SELECTING DEVICES GENERATING THE SELECTED REQUEST SIGNAL

[75] Inventor: Takafumi Hashiguchi, Kawasaki, Japan

[73] Assignee: Kabushiki Kaisha Toshiba, Kawasaki, Japan

[21] Appl. No.: 09/024,451

[22] Filed: Feb. 17, 1998

[30] Foreign Application Priority Data

Feb. 18, 1997 [JP] Japan ..................................... 9-033659

[51] Int. Cl.⁶ ...................................................... G06F 1/10
[52] U.S. Cl. ............................ 710/60; 709/301; 709/107;
710/107; 710/113; 711/119; 711/150; 713/501;
370/402
[58] Field of Search .................................... 709/301, 107;
710/60, 107, 113; 711/119, 150; 713/501;
370/402; 341/100; 348/12; 367/21; 455/567;
368/84

[56] References Cited

U.S. PATENT DOCUMENTS

| | | | |
|---|---|---|---|
| 4,063,409 | 12/1977 | Bayliss | 368/84 |
| 4,884,294 | 11/1989 | Inagami | 455/567 |
| 5,206,835 | 4/1993 | Beauducel | 367/21 |
| 5,282,028 | 1/1994 | Johnson et al. | 348/12 |
| 5,491,814 | 2/1996 | Yee et al. | 713/501 |
| 5,524,112 | 6/1996 | Azuma et al. | 370/402 |
| 5,548,767 | 8/1996 | Langendorf | 709/301 |
| 5,574,883 | 11/1996 | Freeman | 711/119 |
| 5,634,042 | 5/1997 | Kashiwagi et al. | 713/501 |
| 5,721,545 | 2/1998 | Poplevine | 341/100 |
| 5,727,171 | 3/1998 | Iachetta, Jr. | 710/107 |

FOREIGN PATENT DOCUMENTS

| | | |
|---|---|---|
| 407160381 | 6/1995 | Japan . |
| 407250104 | 9/1995 | Japan . |
| 408335933 | 12/1996 | Japan . |

*Primary Examiner*—Thomas C. Lee
*Assistant Examiner*—Tammara Peyton
*Attorney, Agent, or Firm*—Oblon, Spivak, McClelland, Maier & Neustadt, P.C.

[57] ABSTRACT

A serial data transfer circuit comprises a clock generator for generating at least one kind of clock signals requested by a plurality of transmission units and a plurality of reception units on the basis of a reference clock signal for generating the serial clock signals, first clock request signals and second clock request signals, and a clock selector for selecting the transmission unit and reception unit, which request serial clock signals, among the transmission units and reception units, on the basis of the first clock request signals and the second clock request signals, and supplying the serial clock signals requested by the selected transmission unit and reception unit to the selected transmission unit and reception unit.

12 Claims, 12 Drawing Sheets

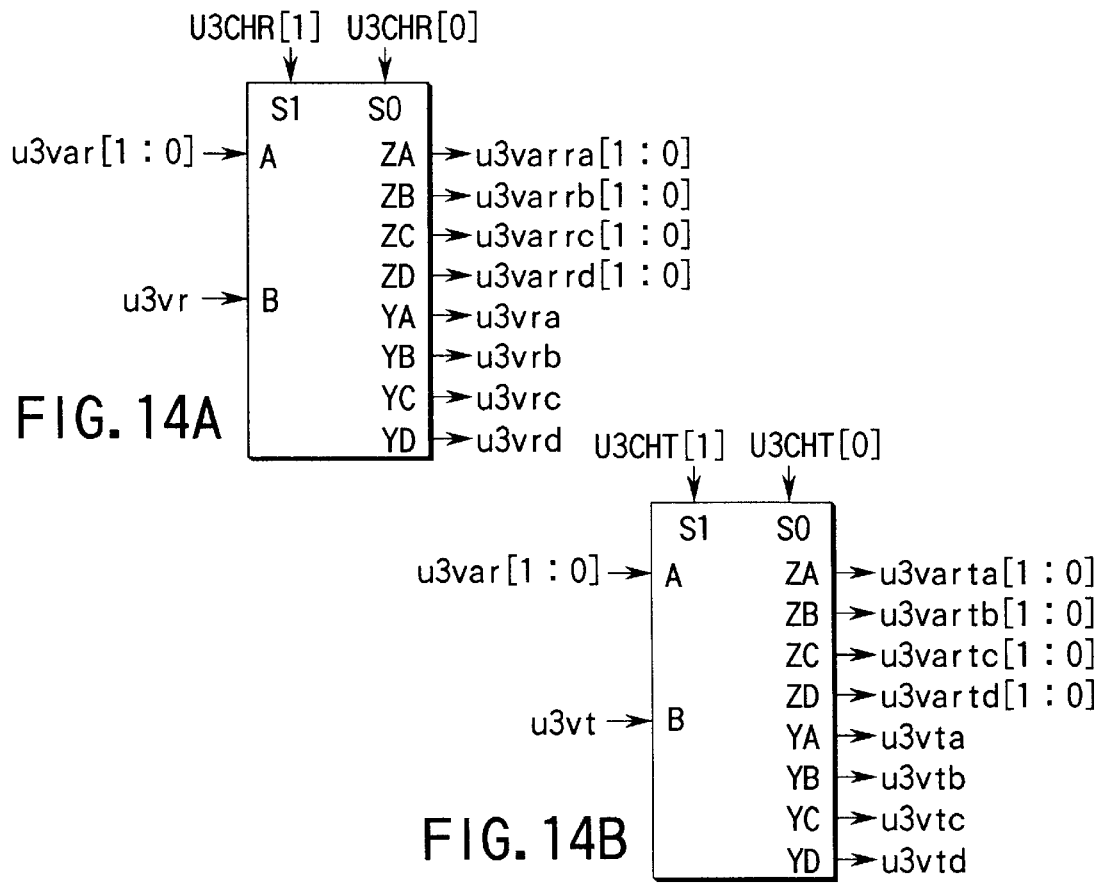
FIG. 14A
FIG. 14B
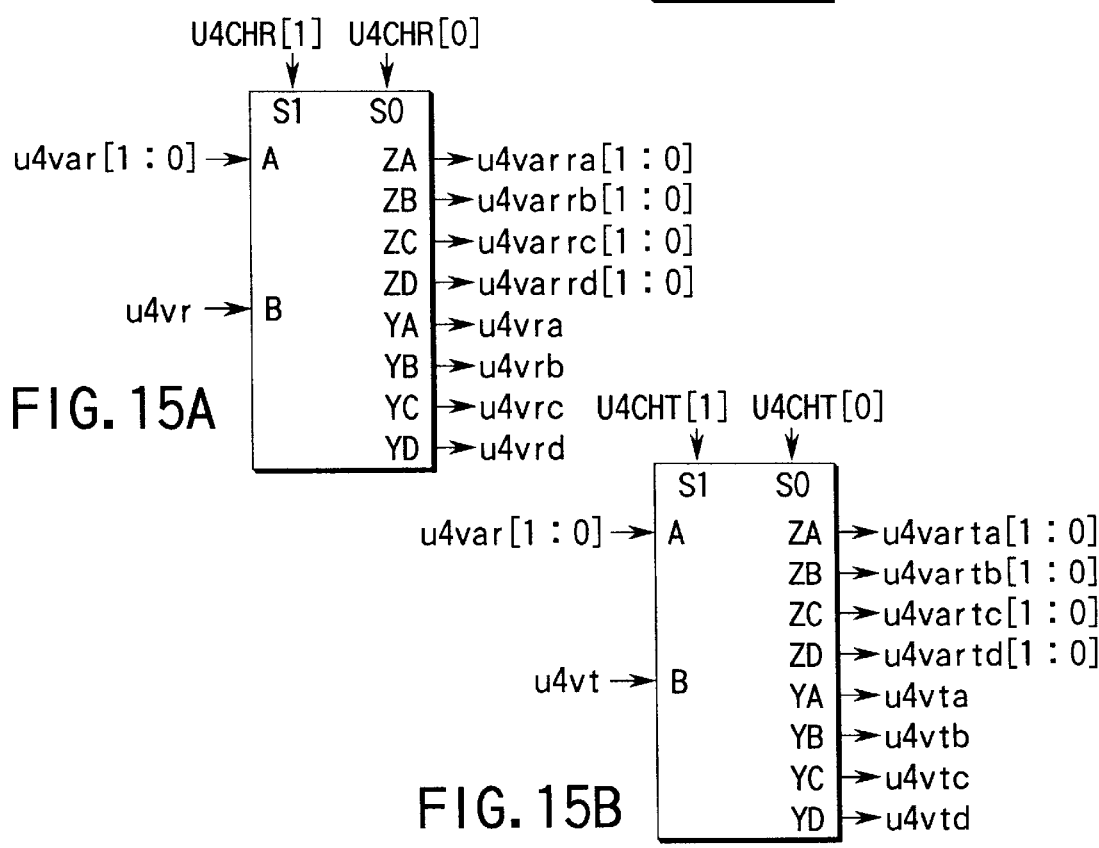
FIG. 15A
FIG. 15B

```
bravar[0]=u2varra[0] | u3varra[0] | u4varra[0];
brbvar[0]=u2varrb[0] | u3varrb[0] | u4varrb[0];
brcvar[0]=u2varrc[0] | u3varrc[0] | u4varrc[0];
brdvar[0]=u2varrd[0] | u3varrd[0] | u4varrd[0];

bravar[1]=u2varra[1] | u3varra[1] | u4varra[1];
brbvar[1]=u2varrb[1] | u3varrb[1] | u4varrb[1];
brcvar[1]=u2varrc[1] | u3varrc[1] | u4varrc[1];
brdvar[1]=u2varrd[1] | u3varrd[1] | u4varrd[1];

bravar[2]=u2vra | u3vra | u4vra;
brbvar[2]=u2vrb | u3vrb | u4vrb;
brcvar[2]=u2vrc | u3vrc | u4vrc;
brdvar[2]=u2vrd | u3vrd | u4vrd;

bravar[3]=u2vta | u3vta | u4vta;
brbvar[3]=u2vtb | u3vtb | u4vtb;
brcvar[3]=u2vtc | u3vtc | u4vtc;
brdvar[3]=u2vtd | u3vtd | u4vtd;
``` bravar[0]=u2varra[0] | u3varra[0] | u4varra[0];

| : OR

FIG. 16

| INPUT | | | | OUTPUT | | | | CONTENT |
|---|---|---|---|---|---|---|---|---|
| bravar | | | | br00 | br01 | br02 | br05 | |
| 3 | 2 | 1 | 0 | mask | mask | mask | mask | |
| 0 | 0 | 0 | 0 | 1 | 1 | 1 | 1 | NO CLOCK REQUEST |
| 0 | 0 | 0 | 1 | 0 | 1 | 1 | 1 | TRANSFER CLOCK R1, T1 |
| 0 | 0 | 1 | ? | 0 | 0 | 1 | 1 | TRANSFER CLOCK R2, T2 |
| 0 | 1 | ? | ? | 0 | 0 | 0 | 1 | TRANSFER CLOCK R3 |
| 1 | ? | ? | ? | 0 | 0 | 0 | 0 | TRANSFER CLOCK T3 |

?: DON'T CARE

| UxMDR | | TRANSFER MODE |
|---|---|---|
| 1 | 0 | |
| 0 | 0 | NO CLOCK REQUEST |
| 0 | 1 | TRANSFER CLOCK REQUEST R1 |
| 1 | 0 | TRANSFER CLOCK REQUEST R2 |
| 1 | 1 | TRANSFER CLOCK REQUEST R3 |

FIG. 19

| UxMDT | | TRANSFER MODE |
|---|---|---|
| 1 | 0 | |
| 0 | 0 | NO CLOCK REQUEST |
| 0 | 1 | TRANSFER CLOCK REQUEST T1 |
| 1 | 0 | TRANSFER CLOCK REQUEST T2 |
| 1 | 1 | TRANSFER CLOCK REQUEST T3 |

FIG. 20

| U2CHR | | BCU200R | ch NO. |
|---|---|---|---|
| 1 | 0 | | |
| 0 | 0 | br00a | ch A |
| 0 | 1 | br00b | ch B |
| 1 | 0 | br00c | ch C |
| 1 | 1 | br00d | ch D |

FIG. 21

| U2CHT | | BCU200R | ch NO. |
|---|---|---|---|
| 1 | 0 | | |
| 0 | 0 | br00a | ch A |
| 0 | 1 | br00b | ch B |
| 1 | 0 | br00c | ch C |
| 1 | 1 | br00d | ch D |

FIG. 22

| mdrv | U2CHR 1 | U2CHR 0 | BCU212R | ch NO. |
|---|---|---|---|---|
| 0 | 0 | 0 | br02a | ch A |
| 0 | 0 | 1 | br02b | ch B |
| 0 | 1 | 0 | br02c | ch C |
| 0 | 1 | 1 | br02d | ch D |
| 1 | 0 | 0 | br01a | ch A |
| 1 | 0 | 1 | br01b | ch B |
| 1 | 1 | 0 | br01c | ch C |
| 1 | 1 | 1 | br01d | ch D |

FIG. 23

| mdrv | U2CHT 1 | U2CHT 0 | BCU212R | ch NO. |
|---|---|---|---|---|
| 0 | 0 | 0 | br02a | ch A |
| 0 | 0 | 1 | br02b | ch B |
| 0 | 1 | 0 | br02c | ch C |
| 0 | 1 | 1 | br02d | ch D |
| 1 | 0 | 0 | br01a | ch A |
| 1 | 0 | 1 | br01b | ch B |
| 1 | 1 | 0 | br01c | ch C |
| 1 | 1 | 1 | br01d | ch D |

FIG. 24

| OUTPUT | | | INPUT | |
|---|---|---|---|---|
| u2vt | u2vr | u2var | U2MDR | U2MDT |
| | | | 1 0 | 1 0 1 0 |
| 0 | 0 | 0 | 0 0 | 0 0 0 0 |
| 0 | 0 | 0 1 | 0 1 0 ? / 0 ? 0 1 | |
| 0 | 0 | 1 0 | 1 0 0 ? / 0 ? 1 0 / 1 0 1 0 | |
| 0 | 1 | 1 1 | 1 1 0 ? / 1 1 1 0 | |
| 1 | 0 | 1 1 | ? ? 1 1 | |

?: DON'T CARE

FIG. 25

| OUTPUT | | | INPUT | |
|---|---|---|---|---|
| u3vt | u3vr | u3var | U3MDR | U3MDT |
| | | | 1 0 | 1 0 1 0 |
| 0 | 0 | 0 | 0 0 | 0 0 0 0 |
| 0 | 0 | 0 1 | 0 1 0 ? / 0 ? 0 1 | |
| 0 | 0 | 1 0 | 1 0 0 ? / 0 ? 1 0 / 1 0 1 0 | |
| 0 | 1 | 1 1 | 1 1 0 ? / 1 1 1 0 | |
| 1 | 0 | 1 1 | ? ? 1 1 | |

?: DON'T CARE

FIG. 26

| OUTPUT | | | INPUT | |
|---|---|---|---|---|
| u4vt | u4vr | u4var | U4MDR | U4MDT |
| | | | 1 0 | 1 0 1 0 |
| 0 | 0 | 0 | 0 0 | 0 0 0 0 |
| 0 | 0 | 0 1 | 0 1 0 ? / 0 ? 0 1 | |
| 0 | 0 | 1 0 | 1 0 0 ? / 0 ? 1 0 / 1 0 1 0 | |
| 0 | 1 | 1 1 | 1 1 0 ? / 1 1 1 0 | |
| 1 | 0 | 1 1 | ? ? 1 1 | |

?: DON'T CARE

FIG. 27

| U2CHR | | u2vr | u2var | ch NO. |
|---|---|---|---|---|
| 1 | 0 | | | |
| 0 | 0 | u2vra | u2varra | ch A |
| 0 | 1 | u2vrb | u2varrb | ch B |
| 1 | 0 | u2vrc | u2varrc | ch C |
| 1 | 1 | u2vrd | u2varrd | ch D |

FIG. 28

| U2CHT | | u2vt | u2var | ch NO. |
|---|---|---|---|---|
| 1 | 0 | | | |
| 0 | 0 | u2vta | u2varta | ch A |
| 0 | 1 | u2vtb | u2vartb | ch B |
| 1 | 0 | u2vtc | u2vartc | ch C |
| 1 | 1 | u2vtd | u2vartd | ch D |

FIG. 29

| U3CHR | | u3vr | u3var | ch NO. |
|---|---|---|---|---|
| 1 | 0 | | | |
| 0 | 0 | u3vra | u3varra | ch A |
| 0 | 1 | u3vrb | u3varrb | ch B |
| 1 | 0 | u3vrc | u3varrc | ch C |
| 1 | 1 | u3vrd | u3varrd | ch D |

FIG. 30

| U3CHT | | u3vt | u3var | ch NO. |
|---|---|---|---|---|
| 1 | 0 | | | |
| 0 | 0 | u3vta | u3varta | ch A |
| 0 | 1 | u3vtb | u3vartb | ch B |
| 1 | 0 | u3vtc | u3vartc | ch C |
| 1 | 1 | u3vtd | u3vartd | ch D |

FIG. 31

| U4CHR | | u4vr | u4var | ch NO. |
|---|---|---|---|---|
| 1 | 0 | | | |
| 0 | 0 | u4vra | u4varra | ch A |
| 0 | 1 | u4vrb | u4varrb | ch B |
| 1 | 0 | u4vrc | u4varrc | ch C |
| 1 | 1 | u4vrd | u4varrd | ch D |

FIG. 32

| U4CHT | | u4vt | u4var | ch NO. |
|---|---|---|---|---|
| 1 | 0 | | | |
| 0 | 0 | u4vta | u4varta | ch A |
| 0 | 1 | u4vtb | u4vartb | ch B |
| 1 | 0 | u4vtc | u4vartc | ch C |
| 1 | 1 | u4vtd | u4vartd | ch D |

# 5,987,540

SYSTEM HAVING A CLOCK SIGNAL GENERATING CIRCUIT FOR SELECTIVELY GENERATING ONE OF THE REQUESTED CLOCK SIGNALS AND SELECTING DEVICES GENERATING THE SELECTED REQUEST SIGNAL

BACKGROUND OF THE INVENTION

The present invention relates generally to a serial data transfer circuit provided in a semiconductor integrated circuit (IC) device, and this invention is particularly suitable for a product in which a plurality of serial data transfer circuits are provided.

In the field of semiconductor IC devices, there is known a serial data transfer circuit for transferring data in units of a bit as means for communication with other devices. This serial data transfer circuit includes a register unit, a transmission unit, a reception unit and a serial clock generator.

In general, these components are integrated in the serial data transfer circuit, and serial clock signals necessary for data transfer control are generated in the serial clock generator and supplied to the transmission unit and reception unit. In the case of a product containing a plurality of such serial data transfer circuits, the generation of serial clock signals is performed individually.

FIG. 1 is a block diagram showing a conventional serial data transfer circuit. In FIG. 1, reference numeral 11 denotes a serial data transfer circuit, 12-1, 12-2 and 12-3 register units, 13 a transmission unit of the serial transfer circuit, 14 a reception unit of the serial transfer circuit, and 15 a serial clock generator.

A reference clock signal is input to the serial clock generator 15. Serial clock signals for transfer control are generated on the basis of the reference clock signal and are supplied to the transmission unit 13 and reception unit 14. Data transferred to the reception unit 14 is input to the register unit 12-3 in synchronism with the serial clock signal and is supplied to a CPU via a bus. Transfer data delivered to the register unit 12-2 via the bus from the CPU is output from the transmission unit 13 in synchronism with the serial clock signal.

The register units 12-1, 12-2 and 12-3 latch control data delivered from the CPU via the bus. Based on the latched control data, the generation of clock signals by the serial clock generator 15 and the data transfer by the transmission unit 13 and reception unit 14 are controlled.

FIG. 2 shows another conventional serial data transfer circuit. This circuit includes a serial clock generator 15-1 for the transmission unit 13 and a serial clock generator 15-2 for the reception unit 14. The transmission unit 13 and reception unit 14 perform data transfer control at different clock rates. The other structural features and operations are the same as those in FIG. 1.

In the conventional serial data transfer circuit, serial clock signals for data transfer control are generated individually in the respective serial data transfer circuits and can be used only in these respective circuits.

Thus, in the case of the product wherein a plurality of serial data transfer circuits are provided, even if the clock rate for data transfer is the same, it is necessary to set the serial data transfer circuits respectively and generate serial clock signals for data transfer control.

Moreover, even in the case where the same clock rate is achieved, the serial clock generators are operated individually. As a result, power is consumed uselessly, and a reduction in power consumption cannot be achieved.

Furthermore, since serial clock signals for transfer control cannot be shared by the two or more serial data transfer circuits. Consequently, it is not easily achieved to synchronize the serial clock signals among the two or more circuits at the time of transmission/reception.

As has been described above, in the device having the conventional serial data transfer circuits, it is necessary to individually set the serial data transfer circuits and generate serial clock signals for transfer control. Thus, the setting of the circuits is time-consuming.

Besides, in the device having the conventional serial data transfer circuits, the serial clock generators are individually operated even if the same clock rate is achieved, and a useless power consumption increases.

Furthermore, since the serial clock signals for transfer control cannot be shared by the two or more serial data transfer circuits, it is not easily achieved to synchronize the serial clock signals among the two or more circuits at the time of transmission/reception.

BRIEF SUMMARY OF THE INVENTION

The present invention has been made in consideration of the above circumstances, and an object thereof is to provide a serial data transfer circuit wherein when a plurality of serial data transfer circuits are provided within one product and the clock rate for data transfer is the same, serial clock signals for transfer control can be commonly used, and the setting of the clock can be simplified.

Another object of the invention is to provide a serial data transfer circuit wherein when a plurality of serial data transfer circuits are provided within one product and the same clock rate is to be achieved, useless power consumption is reduced and the power consumption is decreased.

Still another object of the invention is to provide a serial data transfer circuit wherein serial clock signals for transfer control can be shared among the serial data transfer circuits and when data is transmitted and received by plural circuits, the serial clock signals can be easily synchronized.

According to a first aspect of the invention, there is provided a serial data transfer circuit comprising:

a plurality of transmission means which output first clock request signals indicating whether or not the transmission means request the serial clock signals and indicating the kind of serial clock signals when the transmission means request the serial clock signals, and transmit data on the basis of supplied serial clock signals;

a plurality of reception means which output second clock request signals indicating whether or not the reception means request the serial clock signals and indicating the kind of serial clock signals when the reception means request the serial clock signals, and receive data on the basis of supplied serial clock signals;

clock generating means for generating at least one kind of clock signals requested by the plurality of transmission means and the plurality of reception means on the basis of a reference clock signal for generating the serial clock signals, the first clock request signals and the second clock request signals; and clock select means for selecting the transmission means and reception means, which request serial clock signals, among the plurality of transmission means and the plurality of reception means, on the basis of the first clock request signals and the second clock request signals, and supplying the serial clock signals requested by the selected transmission means and reception means to the selected transmission means and reception means.

According to a second aspect of the invention, there is provided the serial data transfer circuit of the first aspect, wherein the clock generating means comprises:

generation signal output means for decoding the first and second clock request signals and outputting generation signals for generating at least one kind of clock signals requested by the plurality of transmission means and reception means; and means for dividing the reference clock signal on the basis of the generation signals output from the generation signal output means, thereby generating at least one kind of clock signals requested by the plurality of transmission means and reception means.

According to a third aspect of the invention, there is provided the serial data transfer circuit of the first aspect, further comprising:

first storage means for storing first control data for controlling the clock generating means;

second storage means for storing second control data for controlling the plurality of transmission means; and third storage means for storing third control data for controlling the plurality of reception means.

According to a fourth aspect of the invention, there is provided the serial data transfer circuit of the third aspect, wherein the first, second and third storage means are connected to a CPU over a bus, and the first, second and third control data is supplied from the CPU to the first, second and third storage means.

According to a fifth aspect of the invention, there is provided a serial data transfer circuit comprising:

a first circuit block for generating at least one kind of serial clock signals for transfer control, on the basis of a reference clock signal; and a second circuit block in which data transfer is controlled on the basis of the at least one kind of serial clock signals generated by the first circuit block, wherein the second circuit block comprises:

a plurality of transmission means which output first clock request signals indicating whether or not the transmission means request the serial clock signals and indicating the kind of serial clock signals when the transmission means request the serial clock signals, and transmit data on the basis of supplied serial clock signals; and a plurality of reception means which output second clock request signals indicating whether or not the reception means request the serial clock signals and indicating the kind of serial clock signals when the reception means request the serial clock signals, and receive data on the basis of supplied serial clock signals; and wherein the first circuit block comprises:

clock generating means for generating at least one kind of clock signals requested by the plurality of transmission means and the plurality of reception means on the basis of a reference clock signal for generating the serial clock signals, the first clock request signals and the second clock request signals; and clock select means for selecting the transmission means and reception means, which request serial clock signals, among the plurality of transmission means and the plurality of reception means, on the basis of the first clock request signals and the second clock request signals, and supplying the serial clock signals requested by the selected transmission means and reception means to the selected transmission means and reception means.

According to a sixth aspect of the invention, there is provided the serial data transfer circuit of the fifth aspect, wherein the clock generating means comprises:

generation signal output means for decoding the first and second clock request signals and outputting generation signals for generating at least one kind of clock signals requested by the plurality of transmission means and reception means; and means for dividing the reference clock signal on the basis of the generation signals output from the generation signal output means, thereby generating at least one kind of clock signals requested by the plurality of transmission means and reception means.

According to a seventh aspect of the invention, there is provided the serial data transfer circuit of the fifth aspect, further comprising:

first storage means for storing first control data for controlling the clock generating means;

second storage means for storing second control data for controlling the plurality of transmission means; and third storage means for storing third control data for controlling the plurality of reception means.

According to an eighth embodiment of the invention, there is provided the serial data transfer circuit of the seventh aspect, wherein the first, second and third storage means are connected to a CPU over a bus, and the first, second and third control data is supplied from the CPU to the first, second and third storage means.

According to a ninth aspect of the invention, there is provided a serial data transfer circuit comprising:

a plurality of transmission means which output first clock request signals indicating whether or not the transmission means request the serial clock signals and indicating the kind of serial clock signals when the transmission means request the serial clock signals, and transmit data on the basis of supplied serial clock signals;

a plurality of reception means which output second clock request signals indicating whether or not the reception means request the serial clock signals and indicating the kind of serial clock signals when the reception means request the serial clock signals, and receive data on the basis of supplied serial clock signals;

clock generating means for generating at least one kind of clock signals requested by the plurality of transmission means and the plurality of reception means on the basis of a reference clock signal for generating the serial clock signals, an external clock signal supplied from outside and having a frequency different from a frequency of the reference clock signal, the first clock request signals and the second clock request signals; and clock select means for selecting the transmission means and reception means, which request serial clock signals, among the plurality of transmission means and the plurality of reception means, on the basis of the first clock request signals and the second clock request signals, and supplying the serial clock signals requested by the selected transmission means and reception means to the selected transmission means and reception means.

According to a tenth aspect of the invention, there is provided the serial data transfer circuit of the ninth aspect, wherein the clock generating means comprises:

generation signal output means for decoding the first and second clock request signals and outputting generation signals for generating at least one kind of clock signals requested by the plurality of transmission means and reception means; and means for dividing the reference clock signal and the external clock signal on the basis of the generation signals output from the generation signal output means, thereby generating at least one kind of clock signals requested by the plurality of transmission means and reception means.

According to an eleventh aspect of the invention, there is provided the serial data transfer circuit of the ninth aspect, further comprising:

first storage means for storing first control data for controlling the clock generating means;

second storage means for storing second control data for controlling the plurality of transmission means; and third storage means for storing third control data for controlling the plurality of reception means.

According to a twelfth aspect of the invention, there is provided the serial data transfer circuit of the eleventh aspect, wherein the first, second and third storage means are connected to a CPU over a bus, and the first, second and third control data is supplied from the CPU to the first, second and third storage means.

According to the serial data transfer circuit having the above structure, serial clock signals generated by the serial clock generating means are distributed to the plural reception means and plural transmission means by the output clock select means. When the clock rate for data transfer is the same, serial clock signals for transfer control can be commonly used, and the setting of the clock can be simplified.

If the generation of serial clock signals, which are not requested by the clock select means, is halted, when a plurality of serial data transfer circuits are provided within one product and the same clock rate is to be achieved, useless power consumption is reduced and the power consumption is decreased.

Furthermore, the serial data transfer circuit of the invention can be easily applied to various devices and systems if the control data is supplied from the CPU to control the serial data transfer circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 14A and 14B are block diagrams showing the clock request signal decoder;

FIGS. 15A and 15B are block diagrams showing the clock request signal decoder;

FIG. 16 is a view for explaining logical formulae in the clock request signal decoder;

FIG. 17 is a truth table, showing the operations of the clock halt signal generator;

FIGS. 18 and 19 are views for describing the transfer modes;

FIGS. 20 to 23 are truth tables, corresponding to FIGS. 10A, 10B, 11A and 11B; and FIGS. 24 to 32 are truth tables, corresponding to the circuits shown in FIGS. 12A to 12C, 13A, 13B, 14A, 14B, 15A and 15B.

DETAILED DESCRIPTION OF THE INVENTION

Embodiments of the present invention will now be described with reference to the accompanying drawings.

Figure 3:
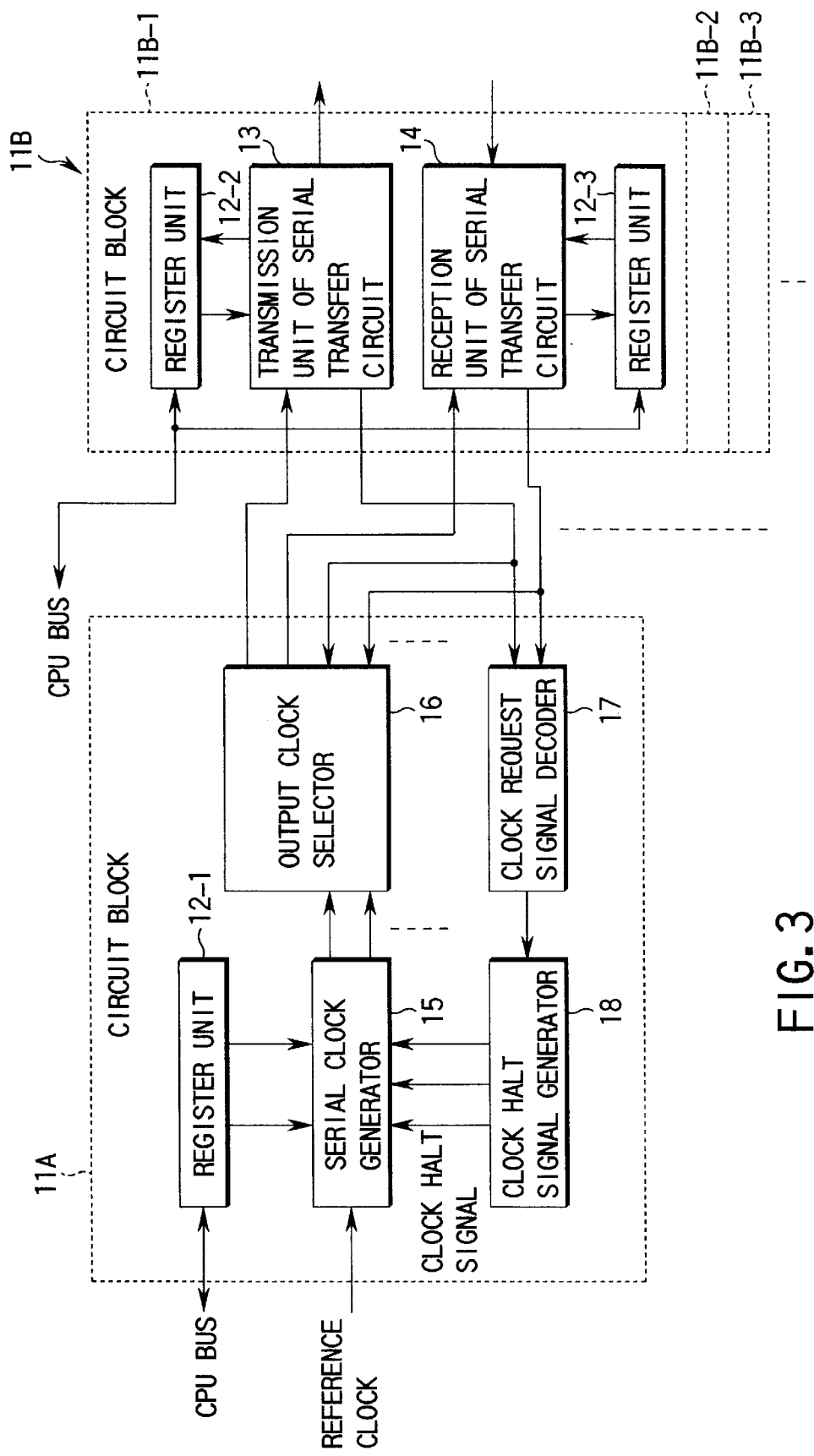
FIG. 3 is block diagram showing a serial data transfer circuit according to a first embodiment of the present invention.

FIG. 3 is a block diagram showing a serial data transfer circuit according to a first embodiment of the invention.

Figure 1:
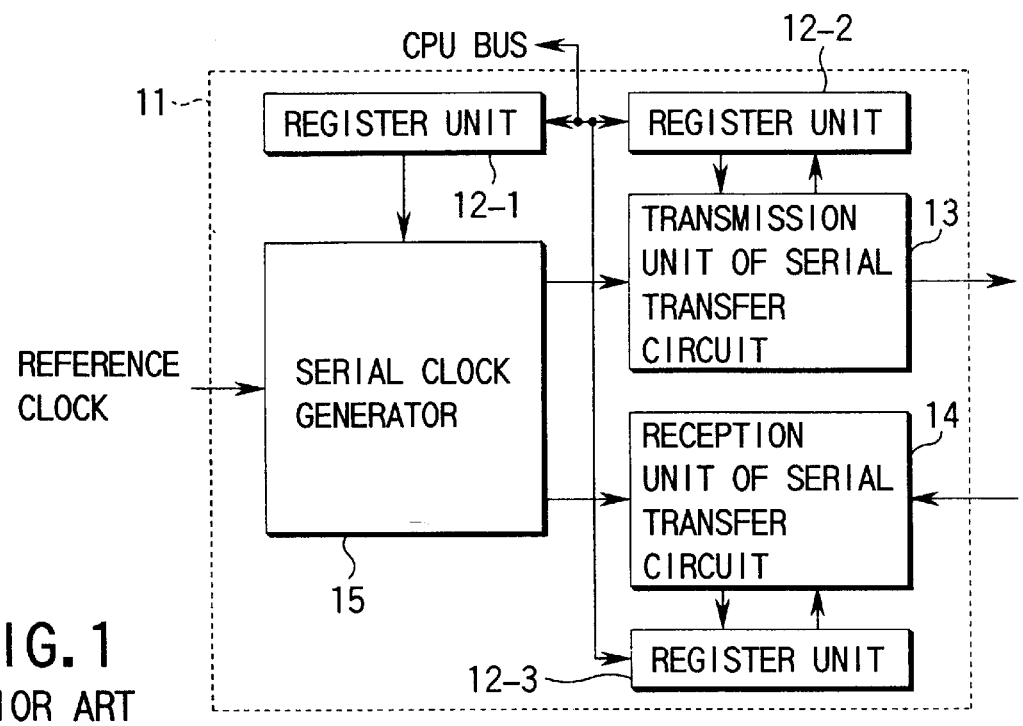
FIG. 1 is a block diagram showing a conventional serial data transfer circuit.
Figure 2:
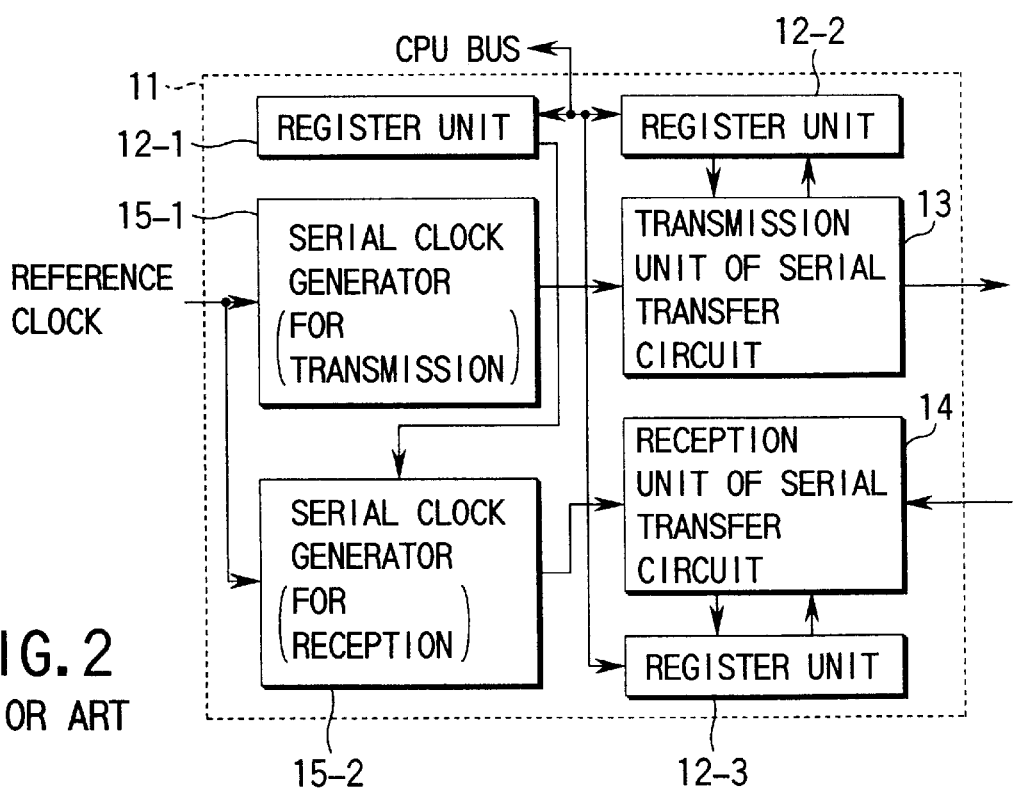
FIG. 2 is a block diagram showing another conventional serial data transfer circuit.

According to the basic structure of this serial data transfer circuit, the serial clock generator 15 in the conventional serial data transfer circuit shown in FIG. 1 is made independent. In addition, the serial data transfer circuit includes an output clock selector 16 for selectively supplying serial clock signals from the serial clock generator 15 to a plurality of transmission units 13 and a plurality of reception units 14; a clock request signal decoder 17 for decoding clock request signals from the transmission units 13 and reception units 14; and a clock halt signal generator 18 for halting some of the operations of the circuit block which are not needed in the serial clock generator 15.

Specifically, a circuit block 11A having the independent serial clock generator 15 includes a register unit 12-1, the output clock selector 16, the clock request signal decoder 17 and the clock halt signal generator 18.

A circuit block 11B comprises transfer circuits 11B-1, 11B-2, 11B-3, . . . each including register units 12-2 and 12-3, a transmission unit 13 and a reception unit 14.

A reference clock signal is input to the serial clock generator 15, and a plurality of serial clock signals for data transfer control are generated from the reference clock signal and supplied to the output clock selector 16.

The output clock selector 16 selects the transmission unit 13 and reception unit 14 requesting clock signals, on the basis of clock request signals supplied from the transmission unit 13 and reception unit 14 of the transfer circuit 11B-1, 11B-2, 11B-3, . . . .

The serial clock signals selected by the output clock selector 16 are supplied, according to selection signals (clock request signals), to the transmission unit 13 or reception unit 14 of the transfer circuit 11B-1, 11B-2, 11B-3, . . . in the circuit block 11B.

Specifically, the requested clock signals are supplied to the transmission unit 13 and reception unit 14 in each circuit block. If no clock signal is requested, no clock signal is supplied to the transmission unit 13 or reception unit 14.

Transfer data is input to the reception unit 14 in synchronism with the serial clock signal supplied from the output clock selector 16. On the other hand, data is output from the transmission unit 13 in synchronism with the serial clock signal supplied from the output clock selector 16.

The register units 12-1, 12-2 and 12-3 are connected to the CPU bus and latch control data from the CPU. Based on the control data latched by the register unit 12-1, the serial clock generator 15 is controlled. Based on the control data latched by the register unit 12-2, the transmission unit 13 is controlled. Based on the control data latched by the register unit 12-3, the reception unit 14 is controlled.

The data transferred to the reception unit 14 is supplied to the register unit 12-3 and fed to the CPU over the bus. The data to be transferred from the transmission unit 13 is supplied from the CPU to the register unit 12-2 over the bus.

Serial clock select signals output from the transmission unit 13 and reception unit 14 of the transfer circuit 11B-1, 11B-2, 11B-3, . . . in the circuit block 11B are supplied to the output clock selector 16, and clock request signals are supplied to the clock request signal decoder 17.

A signal obtained by decoding the clock request signal through the clock request signal decoder 17 is supplied to the clock halt signal generator 18. A clock halt signal generated by the clock halt signal generator 18 is supplied to the serial clock generator 15. Thus, the generation of serial clock signals, which are not requested by the transfer circuit 11B-1, 11B-2, 11B-3, . . . , is halted.

The operation of the serial data transfer circuit having the above-described structure will now be described.

Suppose that clock request signals have been input to the circuit block 11A from the transfer circuit 11B-1, 11B-2, 11B-3, . . . of the circuit block 11B. The clock request signals are decoded by the clock request signal decoder 17, and clock halt signals are supplied from the clock halt signal generator 18 to the serial clock generator 15.

In the serial clock generator 15, when serial clock signals are generated on the basis of the reference clock signal, for example, one of frequency dividers for dividing the reference clock signal is halted. Thereby, generation of clock signals specified by the clock halt signals is halted.

The serial clock generator 15 is controlled by control data supplied to the register unit 12-1 from the CPU over the bus. Serial clock signals generated by the generator 15 are supplied to the output clock selector 16.

Selection signals (clock request signals) are supplied to the output clock selector 16 from the transmission unit 13 and reception unit 14, and selected serial clock signals are delivered to the associated transmission unit 13 and reception unit 14 in the circuit block 11B.

Thus, transferred data is input to the reception unit 14 in synchronism with the serial clock signal, and also transferred data is output from the transmission unit 13 in synchronism with the serial clock signal. The data transfer operations are controlled by control data supplied to the register units 12-2 and 12-3 from the CPU over the bus.

The data transferred to the reception unit 14 is latched in the register unit 12-3, where necessary, and supplied to the CPU over the bus. On the other hand, the data to be transferred from the transmission unit 13 is delivered to the register unit 12-2 from the CPU over the bus.

According to the above structure, the circuit block 11A can be shared by the transfer circuits 11B-1, 11B-2, 11B-3, . . . in the circuit block 11B. Thus, in the product including a plurality of serial data transfer circuits, if the clock rate for data transfer is the same, serial clock signals for data transfer can be commonly used, and the setting of the clock can be simplified.

In addition, in the product including a plurality of serial data transfer circuits, when the same clock rate is to be achieved, the clock request signal decoder 17 and clock halt signal generator 18 cooperate to halt some unnecessary circuit operations in the serial clock generator 15. Since the generation of non-requested serial clock signals can be halted, useless power consumption is reduced and the power consumption is decreased.

Moreover, since serial clock generator 15 is constructed independently, the number of serial data transfer circuits in the product can be increased only by increasing the number of transfer circuits 11B-1, 11B-2, 11B-3, . . . . Compared to the conventional transfer circuit, an increase in the scale of circuit can be suppressed.

Besides, since the serial clock generator 15 which consumes much power is shared, an increase in power consumption of the entire product can be suppressed.

Figure 4:
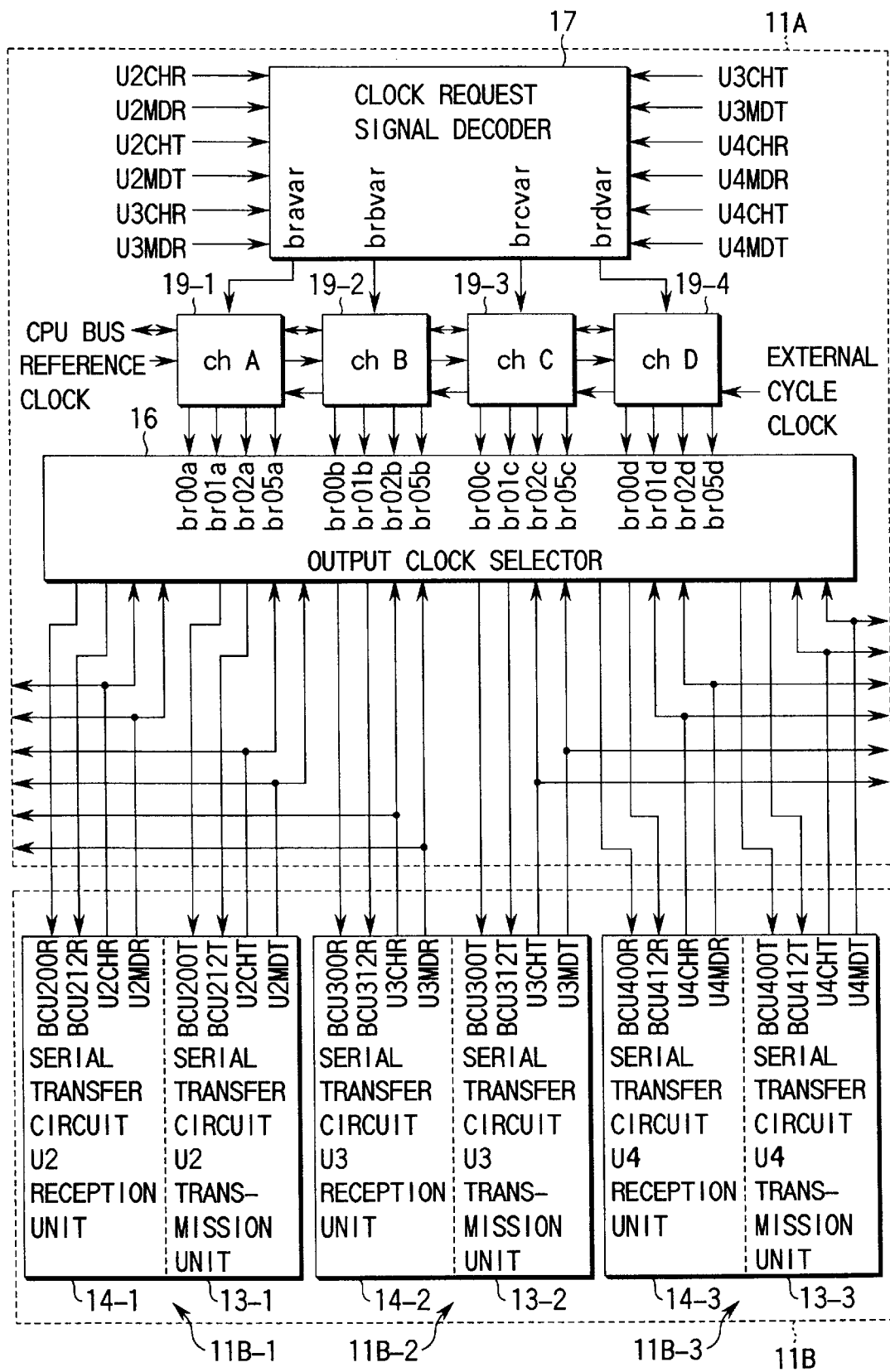
FIG. 4 is block diagram showing a serial data transfer circuit according to a second embodiment of the present invention.

FIG. 4 is a block diagram showing an example of the structure of the serial data transfer circuit according to a second embodiment of the invention. In FIG. 4, the parts common to those in FIG. 3 are denoted by like reference numerals.

The circuit block 11A comprises four channels 19-1 (chA), 19-2(chB), 19-3(chC) and 19-4(chD). The second circuit block 11B comprises three transmission units 13-1, 13-2 and 13-3 and three reception units 14-1, 14-2 and 14-3.

The channels 19-1 to 19-4 have the same circuit construction. Each channel includes the register unit 12-1, serial clock generator 15 and clock halt signal generator 18 shown in FIG. 3.

A reference clock signal and an external cycle clock signal are supplied to the channels 19-1 to 19-4. The channels 19-1 to 19-4 are connected to the CPU over the CPU.

The clock request signal decoder 17 supplies signals bravar, brbvar, brcvar and brdvar to the clock halt signal generators 18 of the respective channels, thereby controlling the operations for generating serial clock signals.

The channels 19-1 to 19-4 generate serial clock signals br00x, br01x, br02x and br05x (x=channel; e.g. x=a in the case of channel chA).

Signals UyCHR, UyMDR, UyCHT and UyMDT (y=transfer circuit number; e.g. y=2 in the case of U2) are input to the clock request signal decoder 17 from the transmission units and reception units of the respective transfer circuits, and the decoded signals are supplied to the respective channels. Thus, clock halt signals for halting the generation of serial clock signals other than necessary serial clock signals are generated.

Figure 5:
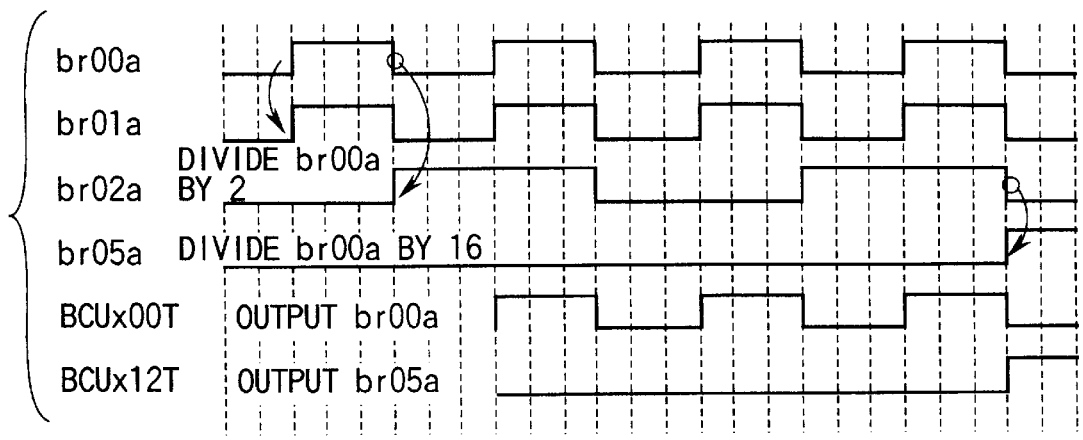
FIG. 5 is a timing chart of transfer clock signals output from the circuit shown in FIG. 4.
Figure 6:
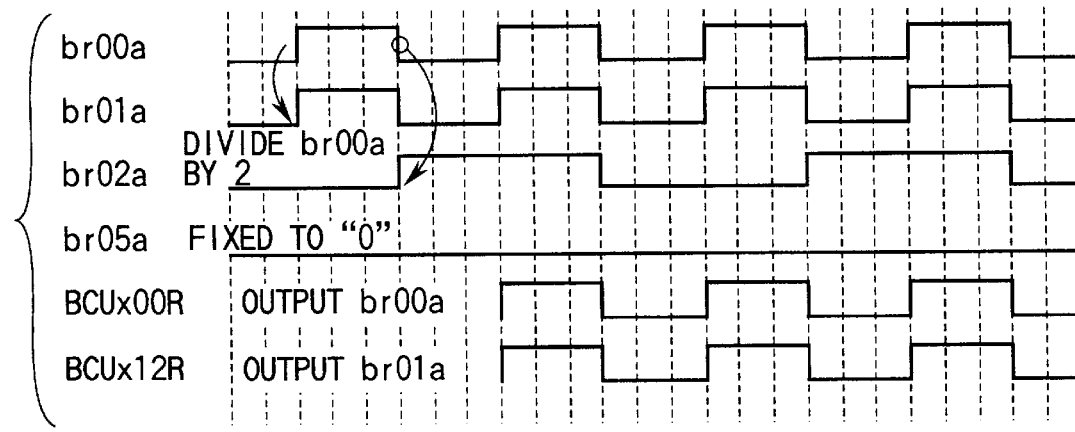
FIG. 6 is a timing chart of transfer clock signals output from the circuit shown in FIG. 4.
Figure 7:
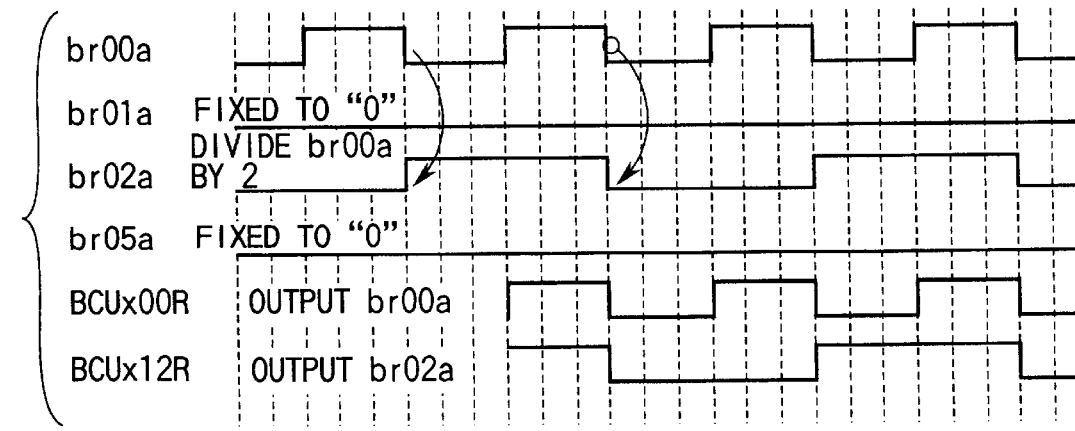
FIG. 7 is a timing chart of transfer clock signals output from the circuit shown in FIG. 4.

FIGS. 5 to 8 are timing charts of serial clock signals output from the circuit shown in FIG. 4. These Figures show serial clock signals (transfer clock signals) T1 to T3 for transmission and serial clock signals (transfer clock signals) R1 to R3 for reception. FIG. 5 shows transfer clock signal T3, FIG. 6 transfer clock signal R3, FIG. 7 transfer clock signals T2 and R2, and FIG. 8 transfer clock signals R1 and T1. Signals br00a, . . . , shown in the timing charts, indicate the case of channel 19-1 (chA) representatively. The basic operations for the other channels 19-2 (chB) to 19-4(chD) are the same, and only the naming of signals differs.

The clock halt signal generators 18 in the respective channels 19-1 (chA) to 19-4 (chD) are constructed to perform logical operations, as shown in the truth table of FIG. 17. The clock halt signals are four: br00mask, br01mask, br02mask and br05mask. The states of these signals are set in accordance with the kind of transfer clock signals requested by the respective transfer circuits. For example, if the transfer clock signal R2 is requested, signals br01mask and br05mask have value "1" as shown in FIG. 17. When br01mask=1, br01a is halted. When br05mask–1, circuits for generating up to br05a are halted.

Figure 9:
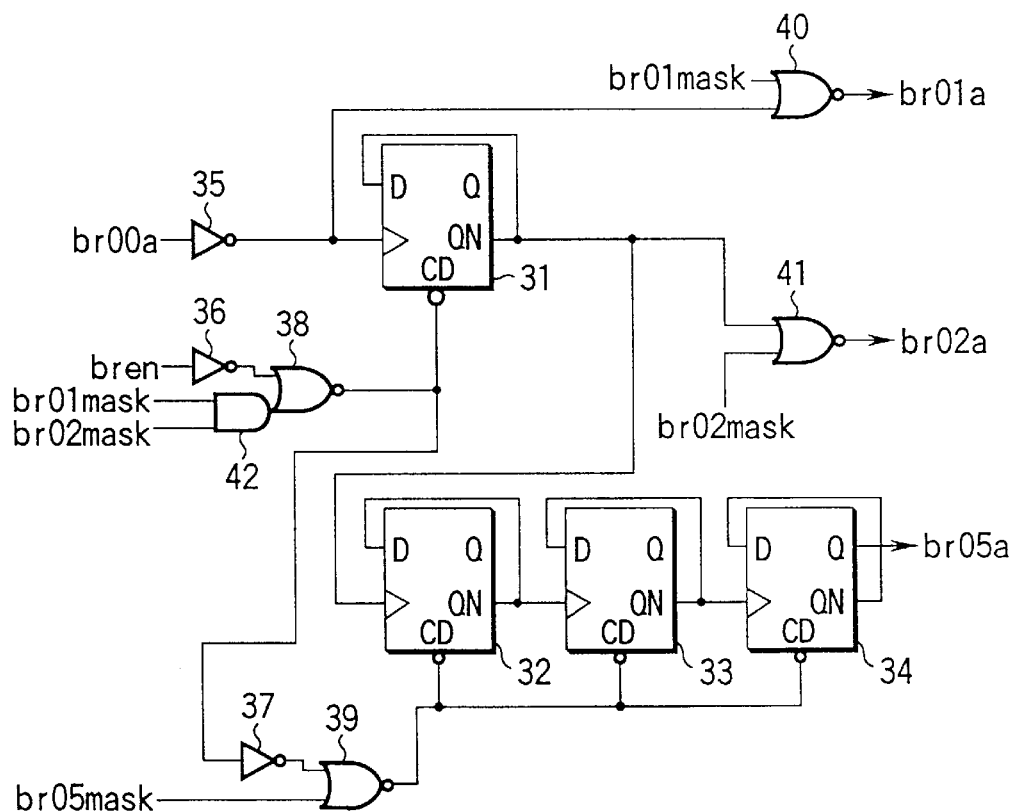
FIG. 9 is a circuit diagram showing a serial clock generator.
Figures 10A, 10B:
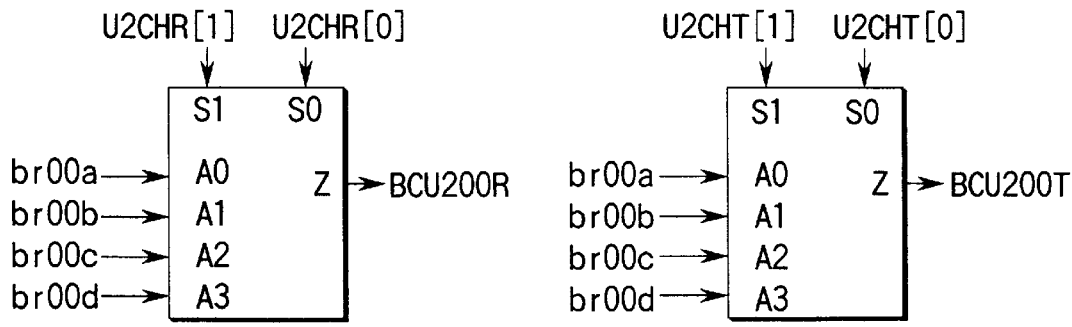
FIGS. 10A and 10B are block diagrams corresponding to serial transfer circuits in the output clock selector shown in FIG. 4.
Figure 11A:
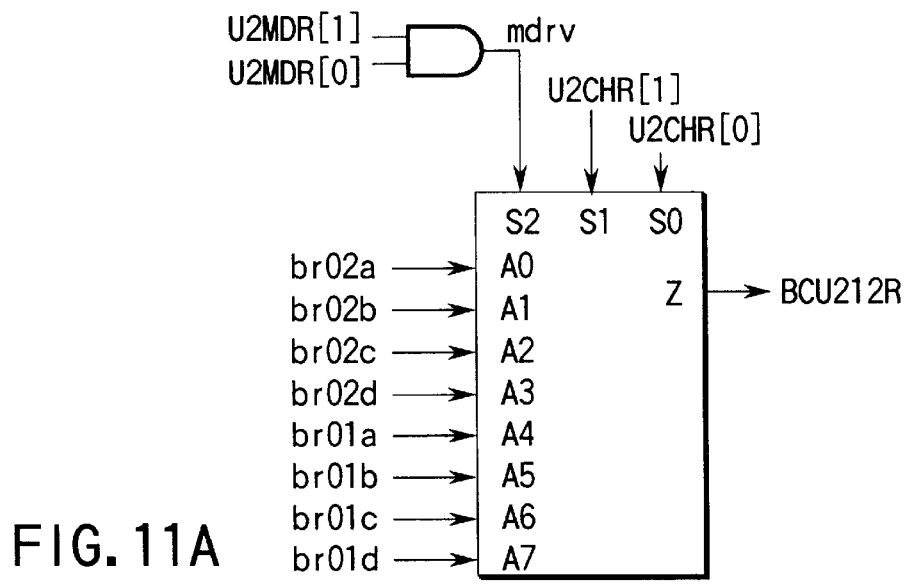
FIGS. 11A and 11B are block diagrams corresponding to serial transfer circuits in the output clock selector shown in FIG. 4.
Figure 11B:
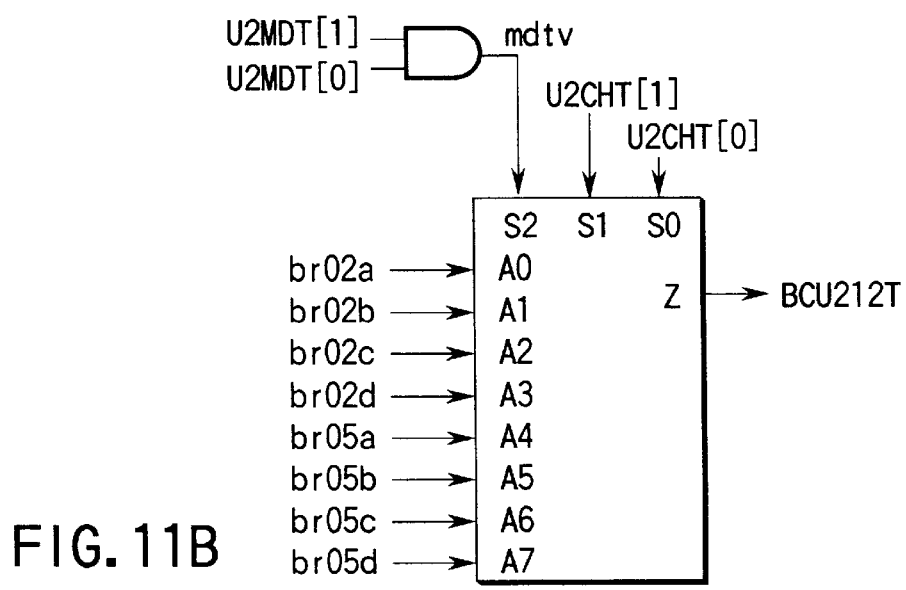
Figure 12A:
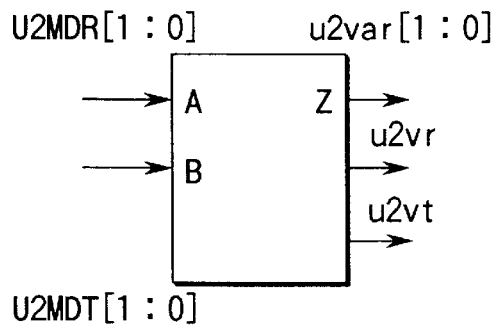
FIGS. 12A to 12C are block diagrams showing examples of specific structures of the clock request signal decoder.
Figure 12B:
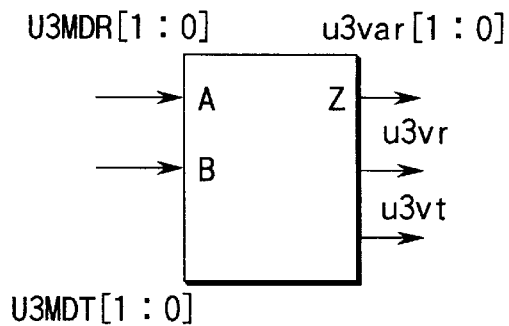
Figure 12C:
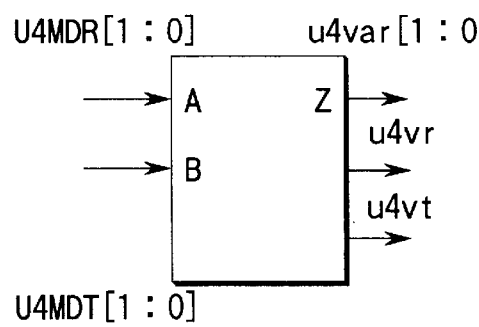
Figure 13A:
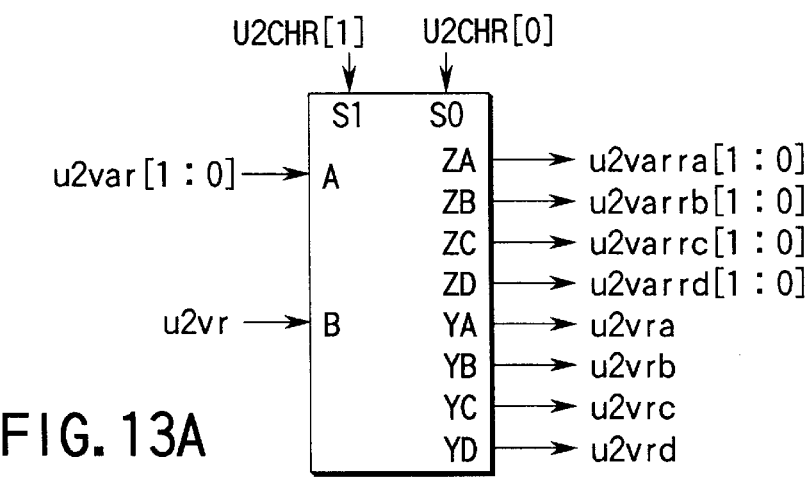
FIGS. 13A and 13B are block diagrams showing the clock request signal decoder.
Figure 13B:
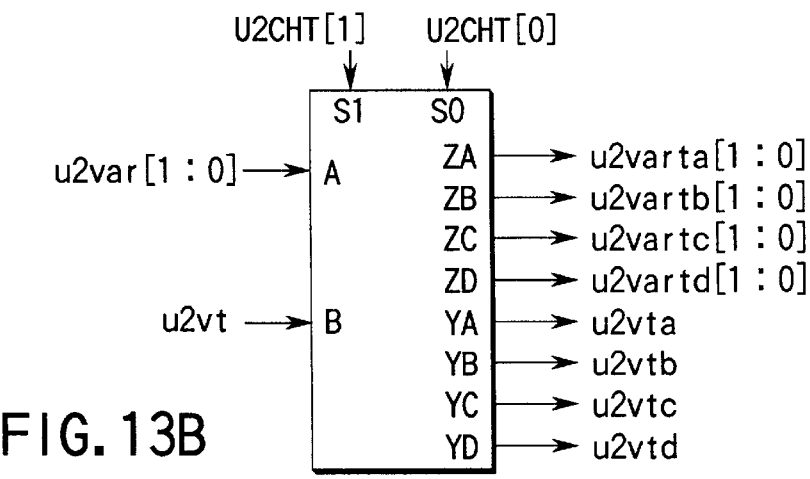

FIG. 9 shows an example of the specific circuit structure of the serial clock generator 15 for achieving the functions as shown in FIG. 17. The serial clock generator 15 comprises flip-flops 31 to 34, inverters 35 to 37, NOR gates 38 to 41, and an AND gate 42. Signal br00a is supplied to an input terminal of the inverter 35. An output from the inverter 35 is supplied to a clock input terminal of the flip-flop 31 and one input terminal of the NOR gate 40. The input terminal of NOR gate 40 is supplied with signal br01mask. Signal br01a is output from an output terminal of the NOR gate 40. An output QN from the flip-flop 31 is supplied to a data input terminal D of the flip-flop 31, to one input terminal of the NOR gate 41, and to a clock input terminal of the flip-flop 32. The other input terminal of NOR gate 41 is supplied with signal br02mask. Signal br02a is output from an output terminal of NOR gate 41.

Signal bren is supplied to an input terminal of the inverter 36. Signals br01mask and br02mask are supplied to input terminals of the AND gate 42. Outputs from the inverter 36 and AND gate 42 are supplied to the NOR gate 38. An output from the NOR gate 38 is supplied to an input terminal of the inverter 37, and also inverted and supplied to a terminal CD of the flip-flop 31.

An output from the inverter 37 and signal br05mask are supplied to the NOR gate 39. An output from the NOR gate 39 is inverted and supplied to terminals CD of flip-flops 32 to 34.

An output QN of the flip-flop 32 is supplied to a data input terminal D of the flip-flop 32 and to a clock input terminal of the flip-flop 33. Similarly, an output QN of the flip-flop 33 is supplied to a data input terminal D of the flip-flop 33 and to a clock input terminal of the flip-flop 34. An output terminal Q of the flip-flop 34 produces signal br05a.

According to the above structure, only serial clock signals necessary for the channel 19-1 (chA) can be generated. Transfer modes are generally divided into those for transmission and those for reception. The modes for transmission and reception are further classified into three kinds, as shown in FIGS. 18 and 19.

Figure 8:
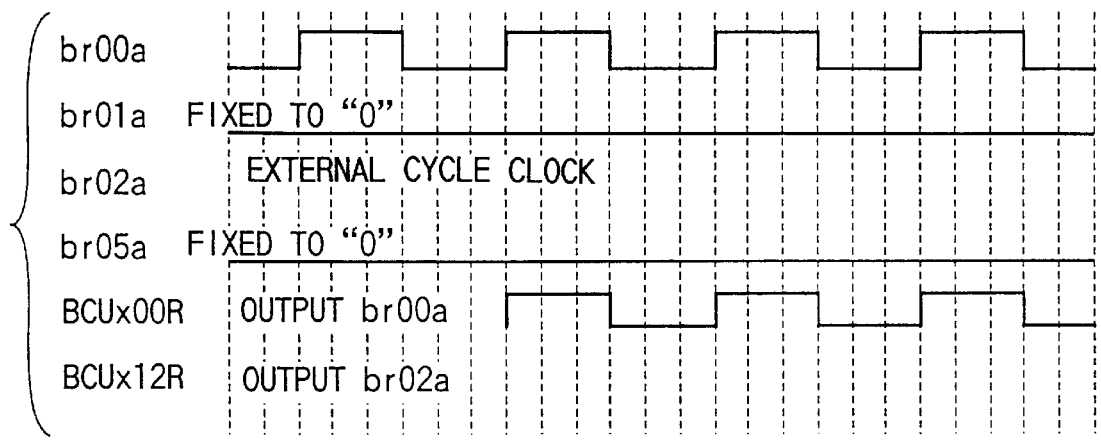
FIG. 8 is a timing chart of transfer clock signals output from the circuit shown in FIG. 4.

FIGS. 5 to 8 are timing charts associated with the classified modes. For example, the timing chart of FIG. 5 showing the transfer clock signal T3 is associated with the transfer clock request T3 in FIG. 19. The timing chart of FIG. 8 shows the case of the transfer clock signal T1.

FIGS. 10A, 10B, 11A and 11B are block diagrams corresponding to the transfer circuit 11B-1 (U2) in the output clock selector 16 in FIG. 4. FIGS. 20 to 23 are truth tables corresponding to FIGS. 10A, 10B, 11A and 11B.

Serial clock signals required in the transfer circuit 11B-1 can be selected by signals U2CHR, U2MDR, U2CHT and U2MDT output from the transfer circuit 11B-1 (U2).

Of these signals, the signal U2CHR is output from the reception unit 14-1 of the transfer circuit 11B-1 and selects the serial clock generator among the channels. Similarly, the signal U2CHT is output from the transmission unit 13-1 and selects the serial clock generator among the channels.

The signals U2MDR and U2MDT are used to determine the transfer modes shown in FIGS. 18 and 19.

FIGS. 12A to 12C, 13A, 13B, 14A, 14B, 15A and 15B are block diagrams showing examples of the specific structure of the clock request signal decoder 17. FIG. 16 is a view for explaining logical formulae of the clock request signal decoder 17.

FIGS. 24 to 32 are truth tables associated with the circuits shown in FIGS. 12A to 12C, 13A, 13B, 14A, 14B, 15A and 15B.

Clock request signals output from the transfer circuit, 11B-1 to 11B-3, are supplied to the clock request signal decoder 17, and the decoded signals are supplied to the serial clock generator in each channel, 19-1 to 19-4.

In the specific operations in this case, the input clock request signals are once decomposed to distinguish the transfer mode, and distributed to the respective serial clock generators of the channels. At the final stage, an OR value is taken for each channel and a decoded signal for each channel is generated. Based on the decoded signal, the clock halt signal generator of each channel is operated.

According to the above structure, the circuit block 11A can be shared by the transfer circuits 11B-1, 11B-2, 11B-3, . . . in the circuit block 11B. Thus, in the product including a plurality of serial data transfer circuits, if the clock rate for data transfer is the same, serial clock signals for data transfer can be commonly used, and the setting of the clock can be simplified.

In addition, in the product including a plurality of serial data transfer circuits, when the same clock rate is to be achieved, the clock request signal decoder 17 and clock halt signal generator cooperate to halt some unnecessary circuit operations in the serial clock generator. Since the generation of non-requested serial clock signals can be halted, useless power consumption is reduced and the power consumption is decreased.

An external sync clock signal is supplied to the channels 19-1 to 19-4 for synchronization. Thus, serial clock signals for transfer control can be shared by a plurality of serial data transfer circuits. When data is transmitted and received by plural circuits, the serial clock signals can be easily synchronized.

Moreover, the number of serial data transfer circuits in the product can be increased only by increasing the number of transfer circuits 11B-1, 11B-2, 11B-3, . . . . Compared to the conventional transfer circuit, an increase in the scale of circuit can be suppressed.

Besides, since the circuit unit which consumes much power is shared, an increase in power consumption of the entire product can be suppressed.

As has been described above, the present invention can provide a serial data transfer circuit wherein when a plurality of serial data transfer circuits are provided within one product and the clock rate for data transfer is the same, serial clock signals for transfer control can be commonly used, and the setting of the clock can be simplified.

The present invention can also provide a serial data transfer circuit wherein when a plurality of serial data transfer circuits are provided within one product and the same clock rate is to be achieved, useless power consumption is reduced and the power consumption is decreased.

Furthermore, this invention can provide a serial data transfer circuit wherein serial clock signals for transfer control can be shared among the serial data transfer circuits and when data is transmitted and received by plural circuits, the serial clock signals can be easily synchronized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A serial data transfer circuit comprising:
    a plurality of transmission means which output first clock request signals indicating whether or not the transmission means request serial clock signals and indicating the kind of serial clock signals when the transmission means request the serial clock signals, respectively, and transmit data on the basis of supplied serial clock signals;
    a plurality of reception means which output second clock request signals indicating whether or not the reception means request serial clock signals and indicating the kind of serial clock signals when the reception means request the serial clock signals, respectively, and receive data on the basis of supplied serial clock signals;
    clock generating means for generating at least one kind of clock signals requested by said plurality of transmission means and said plurality of reception means on the basis of a reference clock signal for generating the serial clock signals, said first clock request signals and said second clock request signals; and
    clock select means for selecting the transmission means and reception means, which request serial clock signals, among said plurality of transmission means and said plurality of reception means, on the basis of the first clock request signals and the second clock request signals, and supplying the serial clock signals requested by the selected transmission means and reception means to the selected transmission means and reception means, respectively.

2. The serial data transfer circuit according to claim 1, wherein said clock generating means comprises:
    generation signal output means for decoding the first and second clock request signals and outputting generation signals for generating at least one kind of clock signals requested by the plurality of transmission means and reception means; and
    means for dividing the reference clock signal on the basis of the generation signals output from the generation signal output means, thereby generating at least one kind of clock signals requested by the plurality of transmission means and reception means.

3. The serial data transfer circuit according to claim 1, further comprising:
    first storage means for storing first control data for controlling the clock generating means;
    second storage means for storing second control data for controlling said plurality of transmission means; and
    third storage means for storing third control data for controlling said plurality of reception means.

4. The serial data transfer circuit according to claim 3, wherein said first, second and third storage means are connected to a CPU over a bus, and said first, second and third control data is supplied from the CPU to the first, second and third storage means.

5. A serial data transfer circuit comprising:
    a first circuit block for generating at least one kind of serial clock signals for transfer control, on the basis of a reference clock signal; and
    a second circuit block in which data transfer is controlled on the basis of said at least one kind of serial clock signals generated by the first circuit block,
    wherein said second circuit block comprises:
        a plurality of transmission means which output first clock request signals indicating whether or not the transmission means request the serial clock signals and indicating the kind of serial clock signals when the transmission means request the serial clock signals, and transmit data on the basis of supplied serial clock signals; and
        a plurality of reception means which output second clock request signals indicating whether or not the reception means request the serial clock signals and indicating the kind of serial clock signals when the reception means request the serial clock signals, and receive data on the basis of supplied serial clock signals; and
    wherein said first circuit block comprises:
        clock generating means for generating at least one kind of clock signals requested by said plurality of transmission means and said plurality of reception means on the basis of a reference clock signal for generating the serial clock signals, said first clock request signals and said second clock request signals; and
        clock select means for selecting the transmission means and reception means, which request serial clock signals, among said plurality of transmission means and said plurality of reception means, on the basis of the first clock request signals and the second clock request signals, and supplying the serial clock signals requested by the selected transmission means and reception means to the selected transmission means and reception means.

6. The serial data transfer circuit according to claim 5, wherein said clock generating means comprises:
    generation signal output means for decoding the first and second clock request signals and outputting generation signals for generating at least one kind of clock signals requested by the plurality of transmission means and reception means; and
    means for dividing the reference clock signal on the basis of the generation signals output from the generation signal output means, thereby generating at least one kind of clock signals requested by the plurality of transmission means and reception means.

7. The serial data transfer circuit according to claim 5, further comprising:

first storage means for storing first control data for controlling the clock generating means;

second storage means for storing second control data for controlling said plurality of transmission means; and third storage means for storing third control data for controlling said plurality of reception means.

8. The serial data transfer circuit according to claim 7, wherein said first, second and third storage means are connected to a CPU over a bus, and said first, second and third control data is supplied from the CPU to the first, second and third storage means.

9. A serial data transfer circuit comprising:

a plurality of transmission means which output first clock request signals indicating whether or not the transmission means request the serial clock signals and indicating the kind of serial clock signals when the transmission means request the serial clock signals, and transmit data on the basis of supplied serial clock signals;

a plurality of reception means which output second clock request signals indicating whether or not the reception means request the serial clock signals and indicating the kind of serial clock signals when the reception means request the serial clock signals, and receive data on the basis of supplied serial clock signals;

clock generating means for generating at least one kind of clock signals requested by said plurality of transmission means and said plurality of reception means on the basis of a reference clock signal for generating the serial clock signals, an external clock signal supplied from outside and having a frequency different from a frequency of the reference clock signal, said first clock request signals and said second clock request signals; and clock select means for selecting the transmission means and reception means, which request serial clock signals, among said plurality of transmission means and said plurality of reception means, on the basis of the first clock request signals and the second clock request signals, and supplying the serial clock signals requested by the selected transmission means and reception means to the selected transmission means and reception means.

10. The serial data transfer circuit according to claim 9, wherein said clock generating means comprises:

generation signal output means for decoding the first and second clock request signals and outputting generation signals for generating at least one kind of clock signals requested by the plurality of transmission means and reception means; and means for dividing the reference clock signal and the external clock signal on the basis of the generation signals output from the generation signal output means, thereby generating at least one kind of clock signals requested by the plurality of transmission means and reception means.

11. The serial data transfer circuit according to claim 9, further comprising:

first storage means for storing first control data for controlling the clock generating means;

second storage means for storing second control data for controlling said plurality of transmission means; and third storage means for storing third control data for controlling said plurality of reception means.

12. The serial data transfer circuit according to claim 11, wherein said first, second and third storage means are connected to a CPU over a bus, and said first, second and third control data is supplied from the CPU to the first, second and third storage means.

* * * * *